United States Patent Office 2,734,067
Patented Feb. 7, 1956

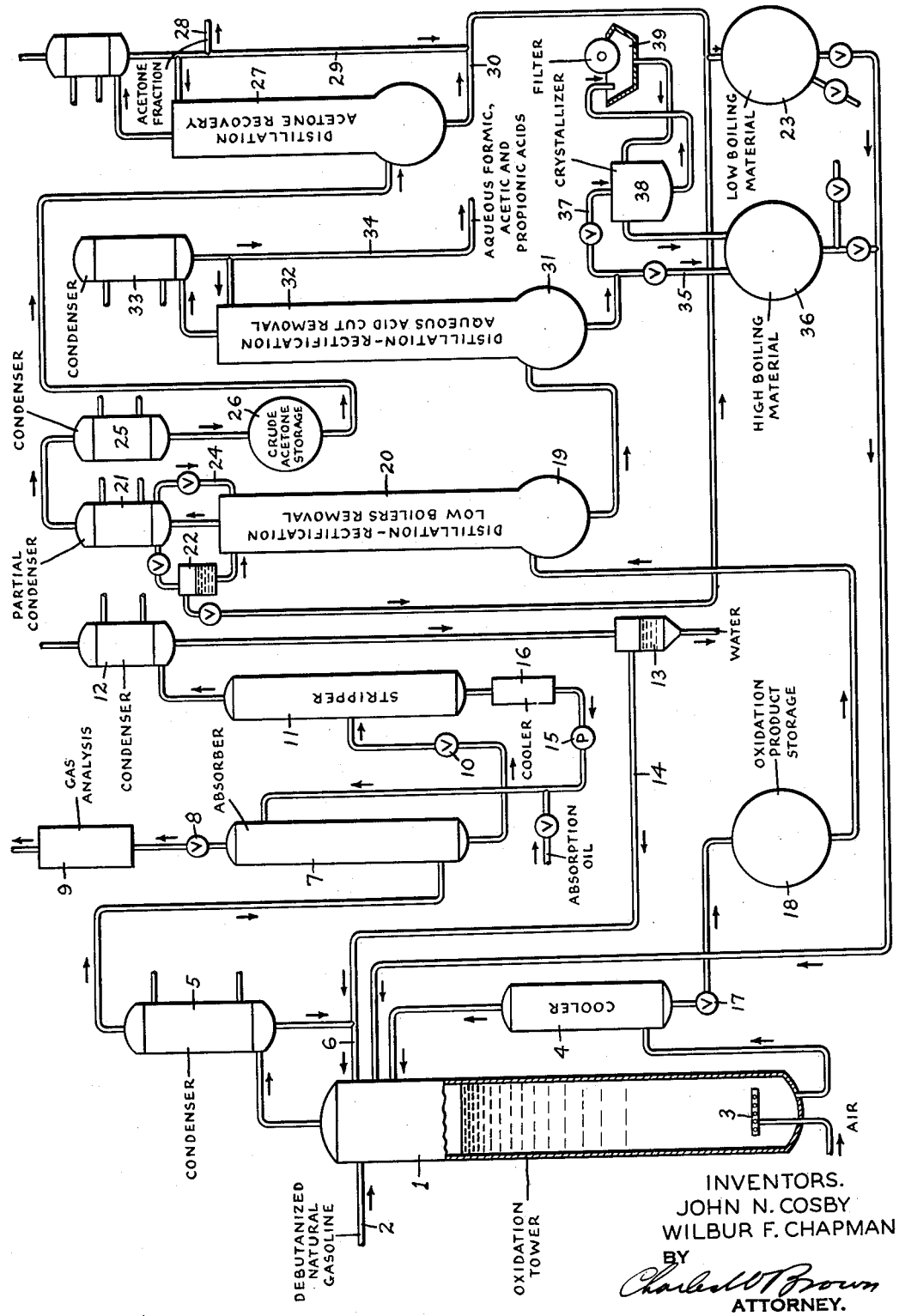
Feb. 7, 1956     W. F. CHAPMAN ET AL     2,734,067
HYDROCARBON OXIDATION
Filed April 8, 1953
INVENTORS.
JOHN N. COSBY
WILBUR F. CHAPMAN
BY
*Charles W. Brown*
ATTORNEY.

2,734,067

HYDROCARBON OXIDATION

Wilbur F. Chapman and John N. Cosby, Morristown, N. J., assignors to Allied Chemical & Dye Corporation, New York, N. Y., a corporation of New York Application April 8, 1953, Serial No. 347,444

8 Claims. (Cl. 260—451)

This invention relates to a process for the liquid phase oxidation of normally liquid low boiling hydrocarbons by gaseous oxygen. More specifically, it is directed to a process whereby the conditions for oxidizing certain hydrocarbons may be readily controlled and, also, they may be oxidized to obtain high yields of acetic acid and, if desired, substantial yields of propionic acid, acetone and esters.

Liquid phase oxidation of hydrocarbons by means of an oxygen-containing gas involves contacting the oxygen gas with a single hydrocarbon or a mixture of hydrocarbons at temperatures below the critical temperature of the hydrocarbon or hydrocarbon mixture and under pressures maintaining two phases, liquid and gas phases, in the oxidation vessel. Numerous procedures have heretofore been proposed for carrying out such liquid phase oxidation of hydrocarbons to form partial oxidation products; alcohols, aldehydes, ketones and acids. It is known that in the presence of various catalysts, at suitable temperatures and pressures, at which the hydrocarbon is maintained liquid, by passing air or similar gaseous mixture of oxygen and inert (non-oxidizing) gas in contact with the hydrocarbon it is oxidized to form a mixture of a large number of intermediate oxidation products.

The production of individual chemicals by such liquid phase oxidation processes, however, has met with many obstacles, both in the oxidation of the hydrocarbons and in the recovery from the liquid oxidation products of marketable products of adequate purity.

In the liquid phase oxidation step itself, the reactions are strongly exothermic and the rate of reaction varies with changing conditions in the reaction mixture. Control of the reaction temperature, to prevent large fluctuations seriously affecting the operation or the product obtained, is difficult. When it is attempted to carry towards completion the oxidation to form intermediate oxidation products, the reaction between the oxygen and the liquid being treated becomes erratic. For example, the oxygen may be readily absorbed for a period of time and the oxidation reactions proceed smoothly. As the treatment of the hydrocarbon with oxygen continues, the reactions frequently slow down to a point at which they stop almost completely. With continued passage of the air, again the oxygen is absorbed and the oxidation progresses at a suitably rapid rate. When it is attempted to recover usable products from the oxidized material and then further oxidize residual material, either by itself or with additional fresh hydrocarbon, the liquid phase oxidation reactions frequently cease altogether. Prolonged treatment with the oxygen gas fails to give significant further oxidation of the material being treated, even though it is far short of the degree of oxidation to which the fresh hydrocarbon alone may be oxidized.

Whether a relatively pure single hydrocarbon or a mixture of numerous different hydrocarbons, such as the oils and oil distillates obtained from natural or synthetic sources, is oxidized, the liquid oxidation products are complex mixtures of numerous compounds ranging in their degree of oxidation from the alcohols to the acids. Many oxidation procedures yield mixtures of partial oxidation products which are exceedingly difficult to separate into the several individual components.

Our invention provides a new process of liquid phase oxidation whereby hydrocarbons are oxidized by air or similar oxygen gas, such as air enriched with oxygen, to obtain high yields of acetic acid or of the lower aliphatic acids, acetic, formic and propionic acids. These three acids generally constitute the major portion by weight of the liquid, hydrocarbon oxidation products other than water which are withdrawn from the system in which our process is carried out. For example, under preferred conditions the acetic acid constitutes more than 50% and the three acids together more than 67% by weight of these liquid oxidation products. Not only is our process particularly effective to convert the hydrocarbons into high yields of acetic acid, but it is also advantageous in that the resulting liquid oxidation product contains the three acids in such relative concentrations and the kind and amounts of the other partial oxidation products are such that the oxidation product may be efficiently treated to recover the acetic, formic and propionic acids, in marketably pure condition, with or without the recovery of acetone and a marketable ester solvent.

The process of our invention is applicable to the oxidation of saturated, aliphatic hydrocarbons (paraffins and cycloparaffins) having boiling points in the range 27° to 100° C. or hydrocarbon mixtures principally or substantially entirely composed of the saturated, aliphatic hydrocarbons of these boiling points, together with other saturated, aliphatic hydrocarbons in limited amounts such that the hydrocarbon mixture boils at temperatures above 25° C. under atmospheric pressure, and has an initial distillation temperature above 0.0° C. and at least 80%, preferably at least 90%, distills over at temperatures below 100° C. (as determined by the standard method of test for distillation of natural gasoline, A. S. T. M. D216–40—"A. S. T. M. Standards on Petroleum Products and Lubricants"). Liquid hydrocarbons suitable for oxidation by the process of our invention are the saturated paraffinic hydrocarbons of the series pentanes, hexanes and heptanes, the cycloparaffinic cyclopentanes and cyclohexanes and oils essentially or substantially entirely consisting of mixtures of such hydrocarbons. The natural gasolines recovered from natural gases, particularly the debutanized natural gasolines, are specific examples of hydrocarbon mixtures rich in the paraffinic and cycloparaffinic hydrocarbons, which are especially suitable for treatment in accordance with our invention.

Such hydrocarbons or hydrocarbon mixtures are oxidized in the liquid phase by heating them to temperatures in the range 150° to 200° C. and passing air or similar oxygen-inert gas mixture, such as oxygen-enriched air or oxygen-impoverished air, in intimate contact with the hydrocarbons under pressures sufficiently high to maintain them in the liquid state (for example, under 500–750 lb./sq. inch). Any of numerous catalysts known to promote the partial oxidation of the hydrocarbons by the air is also present in the reaction mixture. Under these conditions and with suitable contact between the air and the liquid hydrocarbons obtained, for example, by bubbling the air through a column of the liquid of adequate depth, the oxidation reactions will start and, at least for a period of time, will proceed rapidly with practically complete absorption of the oxygen from the air.

At the high temperatures maintained in the oxidation reaction mixture, the gaseous mixture of inert gases (principally nitrogen), the gaseous oxidation products carbon dioxide and carbon monoxide, and any unabsorbed oxygen, which passes out of contact with the reaction mixture is accompanied by vapors of hydrocarbons and hydrocarbon partial oxidation products. This gas-vapor mixture is treated to remove substantially all of the condensible constituents, the hydrocarbons and hydrocarbon partial oxidation products, without removing substantial proportions of the other constituents, including the carbon dioxide, oxygen and nitrogen. The recovered hydrocarbons and hydrocarbon partial oxidation products are returned to the pool of oxidation reaction mixture. The gas mixture left after removal of these constituents represents exit or off gas of our process which may be vented to the atmosphere. If desired, before venting the off gas, residual gaseous hydrocarbon or hydrocarbon partial oxidation products contained therein may be recovered for return to the oxidation reaction mixture.

Our invention is directed to such a liquid phase oxidation process characterized by oxidizing under the following conditions the above-described saturated, aliphatic hydrocarbons or the described hydrocarbon mixtures principally composed of and preferably substantially consisting of those hydrocarbons:

The liquid hydrocarbon material is oxidized by contact with the oxygen-containing gas, preferably air, in a pool of reaction mixture containing its oxidation products, to which fresh hydrocarbon is supplied, and in which 0.7 to 1.8 pounds oxygen are absorbed for every one pound of the fresh hydrocarbon. In a liquid phase oxidation process of this nature, the term "fresh hydrocarbon" refers to the hydrocarbon supplied to the process. It does not include material vaporized or otherwise removed from the oxidation and recovered and returned thereto for further treatment with the oxidizing gas. For most of the hydrocarbons and oil mixtures, including the natural gasolines, treated by our process for production of lower aliphatic acids with production of acetone and esters minimized, about 1.3 to about 1.6 pounds of oxygen are absorbed in the pool for every one pound of fresh hydrocarbon material supplied thereto. To increase the production of acetone and esters relative to the lower aliphatic acids, 0.7 to about 1.2 pounds of oxygen are absorbed in the pool for every one pound of fresh hydrocarbon supplied thereto.

Aqueous phase of the reaction mixture containing dissolved oxygenated products is drawn from the pool in which the oxidation is carried out and treated for recovery of its water, formic acid and acetic acid content separated from lower boiling and higher boiling materials present in this aqueous phase; i. e., separated from material which in a distillation-rectification procedure distills from the aqueous phase at temperatures up to a temperature in the range about 70° C. to about 95° C. (lower boiling material), and at temperatures above a temperature in the range 120° C. to about 150° C. (higher boiling material). In addition to the removal of the water and formic and acetic acids recovered as products, additional oxygenated products may be recovered from the aqueous phase; specifically, acetone, esters and propionic acid. In our preferred processes the acetone and propionic acid are recovered. In oxidizing some hydrocarbon mixtures recovery of at least a part of the acetone facilitates proper operation of the oxidation step. Propionic acid may be economically recovered as a marketable product in conjunction with recovery of the acetic acid. These hydrocarbon oxidation products which are recovered from the aqueous phase of the reaction mixture together with any other materials drawn from the oxidation pool in the aqueous phase and not subsequently returned to the pool are designated as materials removed from the oxidation pool in the aqueous phase.

In oxidizing the above-described hydrocarbons in the liquid phase under the conditions heretofore set forth, we maintain the pool of reaction mixture at an intermediate degree of oxidation of the hydrocarbon characterized by the carbon dioxide content of the exit gas being in the range above 3.5% to 8.5% and the oxygen content no higher than about 3%, by the following adjustments in the amounts of fresh hydrocarbon material supplied to the pool, of material removed from the oxidation pool in the aqueous phase drawn therefrom and of oxygen absorbed therein:

1. When the $CO_2$ content of the exit gas falls below 3.5% (the oxygen may be below or above 3%) or the $O_2$ content of the exit gas fluctuates over a wide range which includes about 4% and more $O_2$ in the gas, e. g. from about 4% or less to about 10% or more, with accompanying increase not followed by a decrease in carbon dioxide (a) the rate of passing oxygen into contact with the oxidation pool is increased, or (b) the rate of removing from the oxidation pool oxidation products in the aqueous phase or (c) the rate of supplying fresh hydrocarbon to the oxidation pool is decreased, thus correcting the low state of oxidation existing in the pool and bringing the oxygen and carbon dioxide contents of the exit gas within the above defined limits.

2. When the exit gas contains above 8.5% $CO_2$ and above 3% $O_2$, (a) the rate of passing oxygen into contact with the oxidation pool is decreased, or (b) the rate of removing from the oxidation pool oxidation products in the aqueous phase or (c) the rate of supplying fresh hydrocarbon to the oxidation pool is increased, thus correcting a condition of too high a state of oxidation in the pool and bringing the carbon dioxide and oxygen contents of the exit gas within the above defined limits.

These carbon dioxide and oxygen contents of the exit gas are based on air, containing 20% oxygen and 80% inert gases, being employed for the oxidation of the hydrocarbon. Other gases containing oxygen may be used, particularly an oxygen enriched air. Using such gases the carbon dioxide and oxygen contents of the exit gases are in direct proportion to the oxygen content of the oxidizing gas to the oxygen content of air. Thus, for any oxidizing gas the carbon dioxide content of the exit gas is in the range above $$\frac{x}{20} \times 3.5\% \text{ to } \frac{x}{20} \times 8.5\%$$

and the oxygen content is no higher than about $$\frac{x}{20} \times 3\%$$

where $x$ is the oxygen content (per cent) of the gas used for oxidizing the hydrocarbon.

In operating a liquid phase hydrocarbon oxidation process under the conditions previously described for carrying out the oxidation of the hydrocarbon material in a pool of reaction mixture, we have discovered it is possible and have found it especially desirable, to return to that pool for further oxidation treatment substantially all the higher boiling, non-acidic material separated from the water, formic and acetic acids, and from propionic acid, if desired, after removing therefrom any solid materials (succinic or aromatic acids and any inorganic salts resulting from corrosion of the apparatus in which the process is carried out) which may be present in amounts in excess of their solubilities at atmospheric temperatures in the higher boiling material. It has been found that in the hydrocarbon oxidation procedure of our invention, this non-acidic, liquid higher boiling material, substantially all of which is recycled to the pool, has something like a catalytic effect on the oxidation reactions, greatly helping to maintain good oxidation conditions in the pool of reaction mixture. Further, it gives even better yields of acetic acid than are obtained from an equal amount (by weight) of fresh hydrocarbon. Accordingly, our invention is particularly directed to processes carried out under the aforedescribed conditions with substantially all the higher boiling material separated from water, formic acid and acetic acid, and from propionic acid when this also is recovered as a product, recycled to the oxidation step after removal of any solid present.

The treatment of the aqueous phase to remove water and acids is best carried out by fractional distillations as described in the specific examples given below. Other methods may be employed, however, which recover the acids by neutralization with an alkali and recovery of the resulting salts by evaporation and crystallization, extraction of desired products with water or other solvents and suitable combinations of distillations, extractions and chemical reactions.

Whatever method is employed for treating the aqueous phase of the reaction mixture, there are removed therefrom and withdrawn from the process water and formic and acetic acids formed by oxidation of the hydrocarbon, separated from lower boiling material and from higher boiling material which, when the aqueous phase is subjected to distillation with rectification of the vapors, distill therefrom at temperatures up to a temperature in the range about 70° C. to about 95° C. and at temperatures above a temperature in the range 120° C. to about 150° C., respectively.

The following additional features desirably may be included in processes operated in accordance with our invention:

1. Substantially all those materials soluble in the aqueous phase of the reaction mixture which distill therefrom at temperatures up to about 150° C., other than water, formic acid and acetic acid, and so much of the acetone, esters and propionic acid as are separately recovered and removed as products, are recycled to the oxidation pool. When the hydrocarbon supplied to the process contains benzene or higher aromatic hydrocarbons, undue build-up of these aromatics in the oxidation system is prevented by their removal from the materials which are recycled.

2. The exit gas from the oxidation step (after removal of condensible vapors of hydrocarbons and partial hydrocarbon oxidation products) is periodically analyzed for its carbon dioxide and oxygen content. The carbon dioxide and oxygen contents of the exit gas are employed as a means for indicating when the required adjustments (described above) in the rates of air and hydrocarbon supplied to the oxidation pool and withdrawal therefrom of oxygenated products soluble in the aqueous phase are to be made, and such adjustments are made in accordance with the thus determined carbon dioxide and oxygen contents of the exit gas.

In further explanation of methods of operation in carrying out our invention, aqueous phase withdrawn from the pool of oxidation reaction mixture for recovery of oxidation products may be accompanied by any small amount of oil phase present in the reaction mixture. When substantial amounts of oil phase are present, it is very desirable to phase separate the oil from the aqueous solution, either in the oxidation apparatus itself or in a separator to which reaction product is withdrawn, and to return the oil directly to the oxidation. In a continuously operating process, for example, by feeding the hydrocarbon to the top of a deep column of reaction mixture through which the air is continuously being passed, aqueous reaction mixture containing little oil may be withdrawn from the bottom of the column and treated for removal of product without special steps being taken to layer separate oil and aqueous phases.

In preferred large scale operation of our process a pool of reaction mixture is maintained in an oxidation vessel to which fresh hydrocarbon and oxidizing gas are continuously supplied and from which aqueous phase of the reaction mixture is continuously drawn and treated for separation of water and formic and acetic acids from lower boiling material and from higher boiling material. Substantially all of the aliphatic hydrocarbons and hydrocarbon partial oxidation products in said lower and higher boiling materials other than esters, acetone, propionic, succinic and aromatic acids, are returned to the pool of reaction mixture for further oxidation treatment.

Several operating methods may be employed to keep the oxidation pool at a proper degree of oxidation. These may be defined in terms of the following equation:

$$K = \frac{a}{bc}$$

where:
K represents a degree of oxidation within the range defined by the above described limiting values for the $CO_2$ and $O_2$ contents of the exit gas,
$a$ represents the rate of passing oxygen into contact with the reaction pool,
$b$ represents the rate of removing from the pool oxidation products in the aqueous phase, and
$c$ represents the rate of supplying fresh hydrocarbon to the pool.

When the value of K is outside the above defined range, at least one of $a$, $b$ and $c$ are changed in the manner required by this equation to bring the value of K within that range. For example, to correct for too low a degree of oxidation, the rate of supplying fresh hydrocarbon to the oxidation pool or the rate of removing oxidation products in the aqueous phase therefrom is decreased or the rate of passing oxygen into contact therewith is increased to bring the carbon dioxide and oxygen contents of the exit gas within the desired range. To correct a condition of too high a degree of oxidation, the supply of fresh hydrocarbon to the reaction mixture or removal of the aqueous phase present therein may be increased or the rate of supplying oxygen may be decreased. In operating a process in accordance with our invention, it is desirable for ease of control of temperature, maximum capacity of apparatus for oxygen absorption, utilization of the oxidation vessel to full capacity, etc., to maintain a uniform and optimum depth of the pool of reaction mixture in the vessel and optimum high flow of oxidation gas. We prefer, therefore, to correct a condition of too low a degree of oxidation by supplying to the pool less fresh hydrocarbon and withdrawing therefrom correspondingly less aqueous phase for removal of oxidation products. To correct a condition of too high a degree of oxidation in the pool, we prefer to increase the rate of supplying fresh hydrocarbon and correspondingly increase the rate of withdrawing aqueous phase from the oxidation pool.

It is preferred not to operate with the carbon dioxide and oxygen contents of the exit gas close to the above defined limits. To do this makes it more difficult to maintain good operating conditions. Furthermore, there is a lag between corrective measures described above being taken and those measures becoming effective to restore desired oxidation conditions. While the best operating conditions may vary with different hydrocarbon materials being supplied to the process, we have found in general that in oxidizing natural gasolines, maintaining the carbon dioxide content of the exit gas at about 4% to about 6% represents good operating conditions with respect to ease of controlling the oxidation process, keeping the oxygen content of the exit gas low and obtaining high yields of the lower acids, formic and acetic acids.

In large scale operation for the oxidation of hydrocarbons by the process of our invention, once suitable conditions are determined with respect to flow of oxygen gas, temperature, rate of supply of fresh hydrocarbon to and removal of oxidation product from the pool of oxidation reaction mixture, separation of oxidation products from the aqueous phase, and returning the recycle materials to the pool, continuous frequent analyses of the exit gas need not be made in order to know when and what adjustments need be made in the operating conditions described above to maintain the carbon dioxide and oxygen content of the exit gas within the limits set forth above. For example, an increase in the amount of low boiling materials in the aqueous phase of the oxidation product indicates the degree of oxidation in the pool is decreasing. Adjustments are made to correct this in the same manner as described above when a similar decrease in degree of oxidation would be indicated by analysis of the exit gas. Thus, skill acquired by long operation of the process in a given apparatus will permit the operators to detect changes in other conditions indicating departure from the desired oxidation conditions. However, we regard continuous or frequent periodic analyses of the exit gas for carbon dioxide and oxygen represent an important new procedure for indicating required changes in operating conditions to maintain the proper degree of oxidation in the pool of reaction mixture, and an important aspect of our invention is this method of control applied to the hydrocarbon oxidation process.

In large scale operations a pool of reaction mixture preferably is maintained in a pressure-resistant vessel to which the fresh hydrocarbon and oxygen-containing gas is supplied and from which aqueous phase is drawn for recovery of the acid fraction and return to the pool of constituents of the lower and higher boiling fractions as heretofore described. Our invention is not, however, limited to a continuous operation of this nature. It may be carried out by a batch-continuous procedure such as described in Example 1 below, wherein the oxidation is carried out in a series of steps which may be indefinitely prolonged, in each step of which the pool of reaction mixture includes materials separated from the acid fraction in treating the reaction product of a previous step. By suitably proportioning the amount of fresh hydrocarbon mixed with recycled material in preparing the pools in which successive oxidations of fresh hydrocarbon are carried out, and the amount of oxygen absorbed in the pool, the oxidation conditions set forth above as characterizing our invention may be maintained in successive steps of such a batch-continuous process.

The accompanying drawing shows diagrammatically apparatus suitable for carrying out processes embodying our invention, and the flow of materials in and through the apparatus.

With reference to the drawing, an oxidation tower 1 is provided with an inlet 2 for the liquid hydrocarbon, preferably debutanized natural gasoline, to the top of the column. Air is supplied to a distributor 3 in the bottom portion of the tower. A cooler 4 in which liquid reaction mixture pumped from the bottom of the tower is cooled and the cooled liquid then returned to the upper portion of the tower, serves as a means for controlling the temperature in the oxidation tower. Means, not shown, are also provided for heating material in the tower, particularly in starting operations, and for controlling the tower temperatures. A condenser 5 cools the gases and vapors leaving the top of the oxidation tower. The resulting oil condensate returns through line 6 to the oxidation tower.

The residual uncondensed gases and vapors leaving condenser 5 pass through a vapor absorption system. In the drawing this is shown as an oil absorber 7 and stripper 11. In the absorber the gases are intimately contacted with an absorption oil, such as kerosene, to absorb residual uncondensed vapors. The gases remaining uncondensed and unabsorbed in condenser 5 and absorber 7 pass through a pressure regulating valve 8 to a gas analysis system 9 where the carbon dioxide and oxygen content of this exit gas is determined. The rich oil leaving the bottom of absorber 7 passes through a pressure reducing valve 10 and thence to stripper 11. In this stripper the rich oil is heated to vaporize the materials absorbed in absorber 7. These are condensed in condenser 12. The condensate is phase separated in separator 13. The upper oil layer is returned through lines 14 and 6 to oxidation tower 1. The lower water phase is withdrawn. Lean oil is drawn by a pump 15 from the bottom of stripper 11 through a cooler 16 and returned to the top of absorber 7.

By means of pressure reducing valves 8 and 10, by introducing the gasoline and air into oxidation tower 1 under pressure, and by drawing liquid phase of the oxidation product from the bottom of cooler 4 through a pressure reducing valve 17, the entire system comprising the oxidation tower, cooler, condenser and absorber, is maintained under the desired high pressure.

Aqueous phase of the oxidation reaction mixture withdrawn through pressure reducing valve 17 is passed to an oxidation product storage vessel 18, whence it is passed to the boiler 19 of a fractional distillation still provided with an efficient rectification column 20. In this still the aqueous phase of the reaction product is distilled at temperatures high enough to vaporize water and lower boiling materials (hydrocarbons and hydrocarbon oxidation products) and carry these lower boiling materials overhead as vapors mixed with steam to a partial condenser 21. Distillate condensed at temperatures of 85° C. and higher flows into a phase separator 22 from which the lower, aqueous phase is returned to the top of rectification column 20 as reflux. The oil phase is passed from the top of separator 22 into low boilers storage 23 from which it is returned to the oxidation tower. Any additional reflux desired for operation of the rectification column may be supplied by returning condensate from condenser 21 directly to the column through line 24. The uncondensed vapors from the top of condenser 21 pass to a condenser 25. Here they are condensed and the condensate is passed to crude acetone storage 26. This crude acetone fraction is redistilled in a distillation apparatus 27, taking off overhead a concentrated acetone fraction through line 28, separate from forerunnings withdrawn through line 29 and residue withdrawn through line 30 and passed to storage 23 for return to the oxidation tower.

Distillation of the aqueous phase of the hydrocarbon oxidation product is continued in the manner described until all materials distilling over at temperatures up to and including a temperature in the range about 70° C. to about 95° C. at the top of column 20 have been carried over. These represent the forerunnings of the distillation to which the oxidation product is subjected.

The residue left in boiler 19 is passed into the boiler 31 of a still provided with a rectification column 32. The residue is here distilled to carry over water and lower aliphatic acids, formic, acetic and propionic acids, as vapors which are condensed in condenser 33. The condensate is in part returned to the top of the rectification column as reflux and in part is withdrawn through line 34 as an aqueous acid distillate from which the purified acids are recovered. Any of the known methods for recovering the acids from such aqueous mixtures may be employed. This distillation is continued to carry over materials distilling over at top column temperatures up to and including about 140° C. The residue of high boiling materials is passed through line 35 to storage 36 or through line 37 to a crystallizer 38.

Depending upon the materials being oxidized and the oxidation conditions in tower 1, the residue from still 31, upon cooling to atmospheric temperatures, may deposit higher organic acids from solution. Also, inorganic salts employed as catalyst for the oxidation reaction may crystallize from this residue. When such deposition of solid would occur, in order to avoid difficulties in pumping back through line 35 directly to storage 36 for high boiling materials and thence to the oxidation tower a mixture of liquid and solid, all or part of the residue from boiler 31 is passed through line 37 into a crystallizer 38 where it is cooled. The crystals formed are filtered from the liquid by means of filter 39 and the mother liquor separated from the crystals is returned to crystallizer 38. Mother liquor from which crystals have settled out passes from the crystallizer to residue storage 36. In so far as all or a part of the distillation residue from boiler 31 may be sent directly to storage 36 and thence to the oxidation tower, this is done.

The following examples more particularly describe specific conditions for employing the process of our invention by methods described above and illustrated in the drawing. In the examples, when quantities of material are given in "parts," it is in parts by weight.

*Example 1.*—The process of this example was carried out in a batch-continuous manner in a modification of the apparatus illustrated in the accompanying drawing. The gases leaving the oxidation tower, after passing through a condenser 5, were passed through traps to recover condensate carried in suspension in the gas and then through absorbent charcoal for final absorption of residual uncondensed vapors before being passed to gas analysis 9. By periodically heating the charcoal the absorbed vapors were recovered. Condensate obtained by cooling these vapors was returned to the oxidation tower. Aqueous phase withdrawn from the oxidation tower, from which oil phase was layer separated and returned to the oxidation tower, was subjected to two successive batch distillations with total condensation of the vapors distilled over. The distillate of low boilers from the first distillation and the residue of high boiling material separated from an aqueous acid fraction by the second distillation, were returned to the oxidation tower.

The oxidation tower was charged with 1000 parts of a debutanized natural gasoline and 0.25 part each of manganese acetate and cobalt acetate dissolved in aqueous acetic acid. This charge gave an oil depth in the oxidation tower of about 4 feet above the air inlet. Compressed air was then admitted to build up the pressure in the oxidation tower to 800–1000 p. s. i., and the tower contents were heated to 150° C. With the air inlet to the oxidation tower open, the valve in the off gas withdrawal line (corresponding to valve 8 of the drawing) was opened to permit flow of air into and through the oxidation tower. The oxygen content of the off gas fell from 17–18% in an initial stage to 0–0.2%, and the $CO_2$ content rose from 0–0.2% to 3.6–5.8%. When, after a prolonged period of operation under these conditions, the oxygen content of the off gas rose to about 11%, the oxidation was discontinued.

The tower contents were layer separated. The aqueous layer, separated from an oil layer, was fractionally distilled taking off an aqueous acid cut distilling over at top of column temperatures over the range 100° C. to 110° C., separated from lower boiling forerunnings and higher boiling residue.

The oil layer, separated from the aqueous layer, condensate recovered from the traps and charcoal absorber, the lower boiling forerunnings and the higher boiling residue recovered by distillation of the aqueous phase, were returned to the oxidation tower with 212 parts of fresh gasoline. This charge, totaling 1120 parts, was subjected to oxidation with air at 150° C. under 700–1000 p. s. i. pressure in the manner described above. The oxygen and carbon dioxide contents of the off gas were quickly brought to 0.2%–0% and 4%–7%, respectively. As oxidation proceeded, the carbon dioxide rose to 8.1%–8.6%. By adding 155 parts of oil recovered from the traps and charcoal absorber, the carbon dioxide content was brought down and operation continued with the off gas showing 0.4%–1% oxygen and 5.4%–8.1% carbon dioxide. When the oxygen content suddenly increased to 7.4% and then to 8.6%, the run was discontinued.

The tower contents were treated as described above to layer separate the aqueous phase from the oil phase. The aqueous phase was distilled to recover an aqueous acid cut separate from lower boiling forerunnings and higher boiling residue.

Thereafter the above sequence of steps was carried out repeatedly in a series of six additional runs. The first preliminary run described above had established for the succeeding runs a pool of reaction mixture composed of oil recovered from the gases leaving the oxidation tower, oil phase separated from the oxidation product, distillate of lower boiling material and residue of higher boiling material separated from an aqueous acid cut. All these materials recovered from the oxidation product of one run, except the aqueous acid cut, were returned to the oxidation tower with added fresh gasoline for further treatment with air at 150° C. in the succeeding run. In each run when the oxygen content of the exit gas rose to 10–12% $O_2$ after a prolonged period of the oxidation treatment with the oxygen content below 3% $O_2$ and the carbon dioxide content below 8%, the run was discontinued.

The aqueous acid cuts recovered in the manner described were distilled to obtain purified fractions of formic, acetic and propionic acids. The water separated from these acids was discarded. The following table shows for each of the runs the amount of fresh gasoline introduced in making up the reaction mixture, the top of column distillation temperatures (° C.) of the aqueous acid cut separated from lower and higher boiling materials, and the amount of total acids in the acid cuts recovered:

| Run | Fresh Gas. | Distillation Temperature, degrees | Total Acid |
| --- | --- | --- | --- |
| 1 | 1,000 | 100–110 | 232 |
| 2 | 212 | 100–133 | 301 |
| 3 | 179 | 101–142 | 328 |
| 4 | 329 | 102–150 | 341 |
| 5 | 318 | 101–142 | 326 |
| 6 | 280 | 103–139 | 322 |
| 7 | 275 | 100–139 | 327 |
| 8 | 261 |  | 340 |

A total of 2854 parts of gasoline were charged to the oxidation tower, in which 4336 parts of oxygen were absorbed; equal to 1.67 parts oxygen for every 1 part fresh hydrocarbon material supplied to the reaction mixture. There was produced for each 100 parts of gasoline:

61.3 parts of acetic acid
13.0 parts formic acid
9.4 parts propionic acid

There was left a total of 885 parts other materials, chiefly oils and lower and higher boiling materials separated from the acid fraction of the last run, which would be returned to the oxidation tower with more fresh gasoline in continuing operation of this process.

The gasoline treated in the foregoing process contained about 40% pentanes (iso-, normal, and cyclo-), about 45% of the various aliphatic 6 and 7 carbon hydrocarbons (both paraffinic and naphthenic) and the remainder principally trimethyl pentane and a mixture of octanes. When distilled with efficient rectification of the vapors, it had an initial distillation temperature of 25° C. and 82% distilled over at temperatures below 100° C.

The series of runs described in this example established that the hydrocarbons of the nature described above and employed in carrying out our invention can be oxidized in the liquid phase to form a reaction product having an aqueous phase from which an acid cut may be recovered which is essentially composed of water and formic, acetic and propionic acids, with all liquid lower boiling and higher boiling constituents separated from this aqueous acid cut being recycled to the oxidation step with fresh hydrocarbon material, without these recycled materials interfering with smooth operation of the oxidation step.

*Example 2.*—A debutanized Texas natural gasoline was oxidized in a series of four runs in which the gasoline was oxidized with air at 150–155° C. in the manner described in Example 1 above for oxidizing natural gasoline.

About 80% of this Texas gasoline consisted of the several pentanes, hexanes and heptanes containing 5 to 7 carbon atoms (both paraffinic and naphthenic). The remainder was principally methyl cyclohexane and a mixture of octanes. When distilled with effective rectification, it had an initial distillation temperature of about 23° C. and about 83% distilled at temperatures below 100° C.

The aqueous phase recovered from the oxidation product of each run was fractionally distilled taking off an aqueous acid cut distilling over at top of column temperatures of about 100° to 135° C. The lower boiling forerunnings and higher boiling residue separated from the aqueous acid cut were returned to the oxidation tower with fresh hydrocarbon in making up the reaction mixture for the succeeding run. The following table gives the data for these runs corresponding to the data in the table of Example 1:

| Run | Fresh Gas. | Distallation Temperature, degrees | Total Acid |
|---|---|---|---|
| 1 | 1,000 | 100–133 | 212 |
| 2 | 101 | 99–133 | 415 |
| 3 | 269 | 99–134 | 385 |
| 4 | 324 | 100–136 | 350 |

A total of 1694 parts gasoline was charged and 1.3 parts oxygen absorbed for every 1 part gasoline. The following products were made per 100 parts gasoline charged:

57.2 parts acetic acid
12.9 parts formic acid
9.1 parts propionic acid

There was left a total of 724 parts of material other than the above acids, which would be returned to the oxidation with about 215 parts fresh gasoline in a succeeding fifth run in continuing operation in accordance with the method of this example.

*Example 3.*—The process of this example was carried out in an apparatus illustrated in the accompanying drawing, except that the distillation of the aqueous phase was done in continuously operating distillation columns. Initially the apparatus contained residual liquids held up at the completion of a previous run oxidizing the same Texas debutanized natural gasoline treated in Example 2 above and in this Example 3.

In starting the process of this example, the oxidation tower was charged with 2 gallons of that Texas natural gasoline, 1 gallon of low boiling materials and 1 gallon of high boiling residue carrying with it manganese acetate catalyst which had been left in this residue from the previous operation. The tower contents were heated to 160° C. and compressed air admitted to the tower to build up the pressure to about 700 p. s. i. The valve controlling the rate of withdrawal of off gas from an oil absorber 7 was opened to pass the gas at the rate of about 3 cubic feet per minute. The distillation columns for removal of lower boiling forerunnings and recovery of aqueous acid cut separate from higher boiling residue were brought up to temperature. Conditions then were progressively changed to establish continuous operation in which the gasoline and recycled materials were oxidized at about 190° C. under 700 p. s. i. pressure, withdrawing off gas at rates, varied as desired, within the range of about 5 to about 6.5 cubic feet per minute. The pump feeding fresh gasoline to the oxidizing tower was set to operate at the rate of about 2¾ gallons per hour and pumps recycling lower boiling materials and higher boiling residue, separated in distilling an aqueous acid cut and an acetone fraction from the aqueous phase of the oxidation pool, were set to return those materials at about the rate at which they were recovered.

Aqueous phase of the reaction mixture was withdrawn from the oxidation tower at a rate maintaining substantially constant a liquid depth in that tower of about 14 feet over the air distributor in the bottom of the tower. This aqueous phase was continuously distilled taking off those materials distilling over at top of column temperatures in the range of about 70° to about 90° C. This distillate was fractionally distilled by batch distillation-rectification, taking off as distillate the materials distilling over at top of column temperatures up to temperatures in the range of about 40° C. to about 60° C. This crude acetone fraction was withdrawn for further fractional distillation and analysis of its constituents. The bottoms were returned to low boilers storage for pumping back into the oxidation tower. In the batch distillation of the aqueous phase of the oxidation product shown in the drawing, a similar crude acetone fraction is recovered by the fractional condensation of the vapors from the first distillation column and is then subjected to the further fractional distillation.

The bottoms from the first continuous distillation of the aqueous phase were continuously distilled. An aqueous acid cut distilled over at top of column temperatures in the range of about 100° C. to about 110° C. The bottoms from this distillation were passed directly to storage for high boiling materials and return to the oxidation tower, without passing through the crystallizer and filter shown in the drawing.

After an initial starting-up period the oxidation of the materials in the oxidation tower proceeded smoothly, with the exit gas generally showing an oxygen content of 0%. At times oxygen would appear in the exit gas but usually it was a matter of a few tenths of a percent. The carbon dioxide content of the exit gas was generally in the range of about 5% to about 6.5%. On three occasions measures were taken to correct the state of oxidation in the oxidizing tower in accordance with changes in the carbon dioxide and oxygen contents of the exit gas.

Near the start of the process the oxygen content increased to 1.2%, when it previously had ranged from 0% to a fraction of a percent. This was followed by an increase in the carbon dioxide content to 5.5%, where it had previously been 4.8%–5.0%, and the oxygen dropped to 0%. This incipient fluctuating oxygen content of the exit gas was rising carbon dioxide content, indicated the pool was approaching a low state of oxidation and, unless corrective measures were taken, would not remain in the desired condition for smooth operations. Accordingly, the feed of fresh gasoline to the pool was reduced from 1½ gallons per hour to 1¼ gallons per hour. After a further increase in $CO_2$ content to 7.0%, the decreased feed of fresh gasoline became effective to check the rising tendency in the $CO_2$ content of the exit gas and the oxygen content remained at 0% as the carbon dioxide content fell back to 6%.

On a second occasion, following removal of water phase from the oxidation tower, the supply of fresh gasoline was cut off to check a tendency for the oxygen content of the off gas to increase. This brought the oxygen content back from 0.5% to 0%, but it was followed by rising carbon dioxide contents from 5.4% to 7.0%. This indicated approach to too high a degree of oxidation in the pool. Turning on the flow of fresh gasoline into the oxidation tower checked the rising tendency of the carbon dioxide, which quickly dropped to 5.5% and then 4.4%, accompanied, however, by the oxygen content increasing to 3.5% and 4.1%. This jump in the oxygen content indicated the admission of the gasoline had had insufficient effect in checking the tendency towards a high state of oxidation. Accordingly, aqueous phase was drained from the oxidation tower. This measure brought the oxygen content back to 0% and operation then continued smoothly with the $CO_2$ content being about 6%.

On a third occasion, for reasons other than control of the oxidation conditions, the supply of fresh gasoline to the oxidation pool was discontinued for a period of two hours, the recycle of materials recovered from the aqueous phase of the reaction product being continued. During this period the carbon dioxide content of the exit gas rose to 7.0% followed by a rise in the oxygen content from 0% to 0.5%, then to 6% with the carbon dioxide falling to 4%. At this point the feed of fresh gasoline to the reaction pool was started. The admission of the fresh gasoline soon became effective to check the rising and falling tendencies of the oxygen and carbon dioxide contents, respectively, of the exit gas and smooth operation resumed, with the oxygen content remaining below 1% except for one analysis when it appeared as 1.6%, and the carbon dioxide content remaining in the range 5.5% to 6.9%.

As pointed out above, the higher boiling materials separated from the aqueous acid phase were returned directly to storage and thence to the oxidation tower without passing through the crystallizer and filter shown in the drawing to recover solids from these materials. In thus operating solids deposited in the recycle feed line to the oxidation tower, causing a temporary shutdown for their removal. Succinic acid was removered from these solids. The plugging of the recycle feed line is obviated in the process of the accompanying drawing by passing the high boiling materials through a crystallizer and filter before recycling them to the oxidation tower.

In the process of this example a total of 430.6 parts of fresh gasoline and 179.6 parts of materials held up in the apparatus from a previous run were subjected to the described treatment. A total of 572 parts oxygen were absorbed in the reaction pool in the oxidation tower. This was a ratio of 1.33 parts oxygen for every 1 part of fresh hydrocarbon materials supplied to that pool. There was left as hold up in the apparatus 171.3 parts of material of the type present in starting the run. For every 100 parts of gasoline fed to the system there were obtained the following amounts of oxidation products:

48.0 parts acetic acid
11.8 parts propionic acid
17.7 parts formic acid
3.0 parts succinic acid
18.0 parts acetone
28.8 parts lower and higher boiling materials separated from the aqueous acid cut.

We claim:

1. The process which comprises oxidizing liquid hydrocarbon material in the liquid phase by gaseous oxygen at temperatures in the range 150° to 200° C. under pressures maintaining the hydrocarbon in the liquid state, said liquid hydrocarbon material having an initial distillation temperature above 0° C. and at least 80% distilling over at temperatures below 100° C. and being principally composed of saturated aliphatic hydrocarbons having boiling points in the range 27° to 100° C., said oxidation being carried out in a pool of reaction mixture containing oxidation products of the hydrocarbon material, to which pool an oxygen-containing gas is supplied and 0.7 to 1.8 lbs. of the oxygen are absorbed therein for every 1 lb. of fresh hydrocarbon supplied to the pool, recovering from the gas-vapor mixture leaving contact with said pool substantially all the accompanying vapors of hydrocarbons and hydrocarbon partial oxidation products and returning them to said pool, withdrawing as exit gas the gases from which the hydrocarbon and hydrocarbon partial oxidation products have been separated, maintaining the carbon dioxide content of said exit gas in the range above $$3.5\% \times \frac{x}{20} \text{ to } 8.5\% \times \frac{x}{20}$$

and its oxygen content no higher than about $$3\% \times \frac{x}{20}$$

(where $x$=the percent oxygen in said oxygen-containing gas), treating aqueous phase of the resulting reaction product to remove therefrom water and formic and acetic acids separated from lower boiling materials and from higher boiling material present therein and which distills from said aqueous phase at temperatures above a temperature in the range 120° C. to about 150° C., and subjecting to further liquid phase oxidation substantially all the non-acidic, liquid constituents of said higher boiling material in a pool of reaction mixture to which said non-acidic, liquid constituents together with fresh afore-described liquid hydrocarbon material are supplied and in which the oxidation is carried out under the aforedescribed conditions.

2. The process which comprises oxidizing liquid hydrocarbon material in the liquid phase by gaseous oxygen at temperatures in the range 150° to 200° C. under pressures maintaining the hydrocarbon in the liquid state, said liquid hydrocarbon material having an initial distillation temperature above 0° C. and at least 90% distilling over at temperatures below 100° C. and principally composed of saturated aliphatic hydrocarbons having boiling points in the range 27° to 100° C., said oxidation being carried out in a pool of reaction mixture containing oxidation products of the hydrocarbon material to which fresh hydrocarbon material and air are supplied and in which 0.7 to 1.8 lbs. of oxygen are absorbed from the air for every 1 lb. of fresh hydrocarbon supplied to the pool, recovering from the gas-vapor mixture leaving contact with said pool substantially all of the vapors of hydrocarbons and hydrocarbon partial oxidation products and returning them to said pool, withdrawing as exit gas the gases from which the hydrocarbon and hydrocarbon partial oxidation products have been separated, maintaining the carbon dioxide content of said exit gas in the range above 3.5% to 8.5% and its oxygen content no higher than about 3%, withdrawing from said pool aqueous phase, removing from the withdrawn aqueous phase water and formic and acetic acids dissolved therein separated from lower boiling materials and from higher boiling material which distills from said aqeuous phase at temepratures above a temperature in the range 120° C. to about 150° C., and returning to said pool for further oxidation treatment therein substantially all of the non-acidic liquid constituents of said higher boiling material.

3. The process of claim 2 wherein in addition to a distillate fraction containing water and formic, acetic and propionic acids being recovered from the aqueous phase of the reaction mixture withdrawn from the pool in which the hydrocarbon oxidation is carried out, separated from higher boiling material which distills from the aqueous phase at temperatures above a temperature in the range 120° C. to about 150° C., lower boiling material which distills from the aqueous phase at temperatures up to and including a temperature in the range about 70° C. to about 95° C. is recovered separated from said distillate fraction containing water and formic, acetic and propionic acids, acetone is recovered from said lower boiling material and the remainder thereof is returned to said pool for further oxidation treatment therein, and solid constituents present in said higher boiling material in amounts in excess of their solubilities at atmospheric temperatures are separated therefrom and the remaining liquid constituents are returned to said pool for further oxidation treatment therein.

4. The process which comprises oxidizing liquid hydrocarbon material in the liquid phase by gaseous oxygen at temperatures in the range 150° to 200° C. under pressures maintaining the hydrocarbon in the liquid state, said liquid hydrocarbon material having an initial distillation temperature above 0° C. and at least 80% distilling over at temperatures below 100° C. and being principally composed of saturated aliphatic hydrocarbons having boiling points in the range 27° to 100° C., said oxidation being carried out in a pool of reaction mixture containing oxidation products of the hydrocarbon material, to which pool an oxygen-containing gas is supplied and 0.7 to 1.8 lbs. of the oxygen are absorbed therein for every 1 lb. of fresh hydrocarbon supplied to the pool, recovering from the gas-vapor mixture leaving contact with said pool substantially all the accompanying vapors of hydrocarbons and hydrocarbon partial oxidation products and returning them to said pool, withdrawing as exit gas the gases from which the hydrocarbon and hydrocarbon partial oxidation products have been separated, treating aqueous phase of the resulting reaction product to remove therefrom water and formic and acetic acids separated from lower and higher boiling materials present in said aqueous phase and which distill therefrom at temperatures up to a temperature in the range about 70° C. to about 95° C. and at temperatures above a temperature in the range 120° C. to about 150° C., respectively, subjecting to further liquid phase oxidation under the aforedescribed conditions substantially all the non-acidic, liquid constituents of said higher boiling material separated from the water and formic and acetic acids together with additional amounts of said liquid hydrocarbon material, and in oxidizing said liquid hydrocarbon material maintaining operating conditions in said pool of reaction mixture such that the carbon dioxide content of said exit gas is in the range above $$3.5\% \times \frac{x}{20} \text{ to } 8.5\% \times \frac{x}{20}$$

and its oxygen content is no higher than about $$3\% \times \frac{x}{20}$$

(where $x$=the percent oxygen in said oxygen-containing gas), by changing at least one of the values for $a$, $b$, and $c$ in the equation $$K = \frac{a}{bc}$$

in the manner required by said equation to maintain the value of K within said range, when the carbon dioxide and oxygen contents of the exit gas tend to pass outside their above defined limiting values; where K represents a degree of oxidation in said pool within the ranges defined by the aforedescribed limiting values for the carbon dioxide and oxygen contents of the exit gas, $a$ represents the rate of passing oxygen into contact with said pool, $b$ represents the rate of removing from said pool oxygen products in the aqueous phase, and $c$ represents the rate of supplying fresh hydrocarbon to the pool.

5. The process of claim 4 wherein the exit gas is repeatedly analyzed for its content of carbon dioxide and oxygen and changes in $a$, $b$, and $c$ of the equation $$K = \frac{a}{bc}$$

are made when indicated by the thus determined carbon dioxide and oxygen contents of the exit gas.

6. The process which comprises oxidizing liquid hydrocarbon material in the liquid phase by gaseous oxygen at temperatures in the range 150° to 200° C. under pressures maintaining the hydrocarbon in the liquid state, said liquid hydrocarbon material having an initial distillation temperature above 0° C. and at least 90° distilling over at temperatures below 100° C., said oxidation being carried out in a pool of reaction mixture containing oxidation products of the hydrocarbon material to which fresh hydrocarbon material and air are supplied and in which 0.7 to 1.8 lbs. of oxygen are absorbed from the air for every 1 lb. of fresh hydrocarbon supplied to the pool, recovering from the gas-vapor mixture leaving contact with said pool substantially all of the vapors of hydrocarbons and hydrocarbon partial oxidation products and returning them to said pool, withdrawing as exit gas the gases from which the hydrocarbon and hydrocarbon partial oxidation products have been separated, withdrawing from said pool aqueous phase, removing from the withdrawn aqueous phase water and formic and acetic acids separated from lower and higher boiling materials present in said aqueous phase and which distill therefrom at temperatures up to a temperature in the range about 70° C. to about 95° C. and at temperatures above a temperature in the range 120° C. to about 150° C., respectively, subjecting to further liquid phase oxidation under the aforedescribed conditions substantially all the non-acidic, liquid constituents of said higher boiling material together with the fresh hydrocarbon material supplied to the aforesaid pool of reaction mixture, and in oxidizing said liquid hydrocarbon material maintaining operating conditions in said pool of reaction mixture such that the carbon dioxide content of said exit gas is in the range above 3.5% to 8.5% and its oxygen content is no higher than about 3%, by changing at least one of the values for $a$, $b$, and $c$ in the equation $$K = \frac{a}{bc}$$

in the manner required by said equation to maintain the value of K within said range, when the carbon dioxide and oxygen contents of the exit gas tend to pass outside their above defined limiting values; where K represents a degree of oxidation of said pool within the range defined by the aforedescribed limiting values for the carbon dioxide and oxygen contents of the exit gas, $a$ represents the rate of passing oxygen into contact with said pool, $b$ represents the rate of removing from said pool oxygen products in the aqueous phase, and $c$ represents the rate of supplying fresh hydrocarbon to the pool.

7. The process of claim 6 in which aqueous phase of the reaction mixture withdrawn from the pool in which the oxidation of the liquid hydrocarbon is carried out is distilled to recover therefrom a distillate fraction containing water and formic, acetic and propionic acids separated from lower boiling and higher boiling materials, an acetone fraction is separately recovered from said lower boiling material, solid constituents present in said higher boiling material in amounts in excess of their solubilities at atmospheric temperatures are separated therefrom, and the remaining constituents of said lower and higher boiling materials are returned to said pool for further oxidation therein together with said liquid hydrocarbon.

8. The process of claim 6 wherein the exit gas is repeatedly analyzed for its content of carbon dioxide and oxygen and changes in $a$, $b$, and $c$ of the equation $$K = \frac{a}{bc}$$

are made when indicated by the thus determined carbon dioxide and oxygen contents of the exit gas.

References Cited in the file of this patent

UNITED STATES PATENTS

| | | |
|---|---|---|
| 1,517,968 | Ellis | Dec. 2, 1924 |
| 1,690,768 | Burwell | Nov. 6, 1928 |
| 1,812,714 | Pugh et al. | June 30, 1931 |
| 1,858,095 | James | May 10, 1932 |
| 1,864,079 | Luther et al. | June 21, 1932 |
| 2,044,014 | Penniman | June 16, 1936 |
| 2,128,909 | Bludworth | Sept. 6, 1938 |
| 2,287,125 | Owen et al. | June 23, 1942 |
| 2,610,197 | Cunningham | Sept. 9, 1952 |

OTHER REFERENCES

Ellis: "The Chemistry of Petroleum Derivatives," vol. II, pages 862–865 (1937). Pub. by Reinhold Publishing Corp., New York, N. Y.